United States Patent [19]
Andre

[11] Patent Number: 6,027,290
[45] Date of Patent: Feb. 22, 2000

[54] STRUCTURAL ASSEMBLY FORMING AN ADDITIONAL MOVABLE DECK ON A ROAD VEHICLE

[75] Inventor: Jean-Luc Andre, Obernai, France

[73] Assignee: Lohr Industrie, Hangenbieten, France

[21] Appl. No.: 09/068,678

[22] PCT Filed: Nov. 6, 1996

[86] PCT No.: PCT/FR96/01737

§ 371 Date: May 14, 1998

§ 102(e) Date: May 14, 1998

[87] PCT Pub. No.: WO97/18103

PCT Pub. Date: May 22, 1997

[30] Foreign Application Priority Data

Nov. 13, 1995 [FR] France .................................. 95 13574

[51] Int. Cl.[7] ...................................................... B60P 1/02
[52] U.S. Cl. ............................... 410/24; 410/4; 187/215; 187/253
[58] Field of Search ................................. 410/4, 24, 26, 410/29.1; 187/215, 251, 252, 253; 414/495, 540; 105/370

[56] References Cited

U.S. PATENT DOCUMENTS

| | | |
|---|---|---|
| 1,892,589 | 12/1932 | Snyder ....................................... 410/24 |
| 4,642,018 | 2/1987 | Leroux et al. ....................... 414/540 X |
| 4,701,086 | 10/1987 | Thorndyke ................................ 410/26 |
| 4,759,668 | 7/1988 | Larsen et al. ............................ 410/26 |
| 4,801,229 | 1/1989 | Hanada et al. ........................... 410/26 |
| 4,943,204 | 7/1990 | Ehrlich ................................ 410/29.1 X |
| 5,051,046 | 9/1991 | Oren ..................................... 410/29.1 |
| 5,730,578 | 3/1998 | Smidler ................................ 410/24 X |

FOREIGN PATENT DOCUMENTS

| | | |
|---|---|---|
| 2 679 194 | 1/1993 | France . |
| 92 10 242 | 10/1992 | Germany . |
| 2 154 184 | 9/1985 | United Kingdom . |
| 95 28297 | 10/1995 | WIPO . |

Primary Examiner—Stephen T. Gordon
Attorney, Agent, or Firm—Davis and Bujold

[57] ABSTRACT

An assembly for use on a road vehicle, consisting of an additional thin deck (4) vertically movable along a plurality of upright posts (8, 9) most of which are collapsible and stowable in an inoperative position within the body of the additional deck (4), and a drive member (7) secured to the additional movable deck for actuating same when required to provide wither a second vertically movable loading deck or, once the posts have been stowed away, a normal free cargo space. The assembly is of interest to all road hauliers and particularly to body mounting businesses.

10 Claims, 3 Drawing Sheets

STRUCTURAL ASSEMBLY FORMING AN ADDITIONAL MOVABLE DECK ON A ROAD VEHICLE

BACKGROUND OF THE INVENTION

The present invention concerns an assembly for vehicles in the form of a loading mechanism with a movable platform attached to the floor of the movable base of a vehicle such as a tractor-trailer, a semi-trailer, a flatbed truck, a railway car, or the like, which carries merchandise or specialized freight, especially freight packed in units; the assembly can be modified at will to form either a second vertically movable loading deck or conventional empty loading space.

A vehicle which transports cargo or general freight, particularly a truck, a semi-trailer, or a trailer truck, is equipped with a loading deck which holds the containers, boxes, cartons, or other receptacles protecting the products being carried.

Such containers are packed as well as possible in the free interior space, arranged in stacks or piles juxtaposed within the cargo space available, in a fairly cohesive, compact unit for the sake of stability and efficient use of space.

If necessary, the containers are secured so they are not jostled as the truck travels along the road or due to acceleration, braking or centrifugal force.

It is generally recognized that having two loading surfaces not only increases freight capacity, but also facilitates loading the vehicle.

Providing a second loading deck that is movable and can be lowered to ground level also simplifies loading, as both loading and unloading can take place in the usual way from this position.

While these features are appealing, the posts supporting the movable intermediate loading deck interfere with loading operations.

In actuality, these supports interfere with both side and rear access. Optimum access during loading/unloading operations is essential, but the dual configuration systems with movable intermediate loading platforms which are presently in use do not provide good access, as they have fixed posts.

SUMMARY OF THE INVENTION

With the present invention, each of these features is available simultaneously, that is, the advantages of the movable intermediate loading platform described above, as well as the inherent advantages of a movable transportation base with only one loading platform that is completely accessible from both the side and the rear.

To achieve this, the invention provides an assembly for a road vehicle formed of one movable intermediate loading surface, with a supplemental deck that is vertically movable along a plurality of vertically collapsible posts which can be stored in the inoperative position within the additional movable deck; it further provides a drive member for this additional deck integrated within the movable deck so it can be converted at will into either a second, vertically movable loading surface or, once the posts are collapsed, into conventional cargo space.

In this way, the cargo can be divided between the original deck and the supplemental movable deck. The containers can be arranged in shorter stacks for greater stability, and the bottommost container will no longer be crushed by the weight of too many containers piled on top of it, as such containers are not designed to withstand this treatment.

The movable supplemental deck is quite thin, so the unit maintains approximately the same cargo capacity as a conventional deck.

The vehicle remains easy to load because of the collapsible posts, which can be folded and stored to provide easy access from the side and the rear.

Furthermore, according to the present invention, one simple operation converts the vehicle from a single cargo deck configuration to a dual deck configuration, and conversely.

BRIEF DESCRIPTION OF THE DRAWING(S)

Other characteristics and features of the invention will be apparent from the following description, given by way of example, taken in conjunction with the drawings, which represent:

FIG. 1: a general perspective view of the loading unit when assembled, with the movable deck raised half way;

FIG. 2: a general perspective view of the locating unit when assembled, showing the movable deck as transparent;

FIG. 3: a general perspective view of the loading unit when collapsed, with the movable deck lowered;

FIG. 4: a general perspective view of the loading unit when collapsed, with the movable platform lowered and the posts upright;

FIGS. 5 and 6: general perspective views of the movable return pulley shown in the upright and horizontal positions, respectively.

DESCRIPTION OF THE PREFERRED EMBODIMENT(S)

Figure 1:
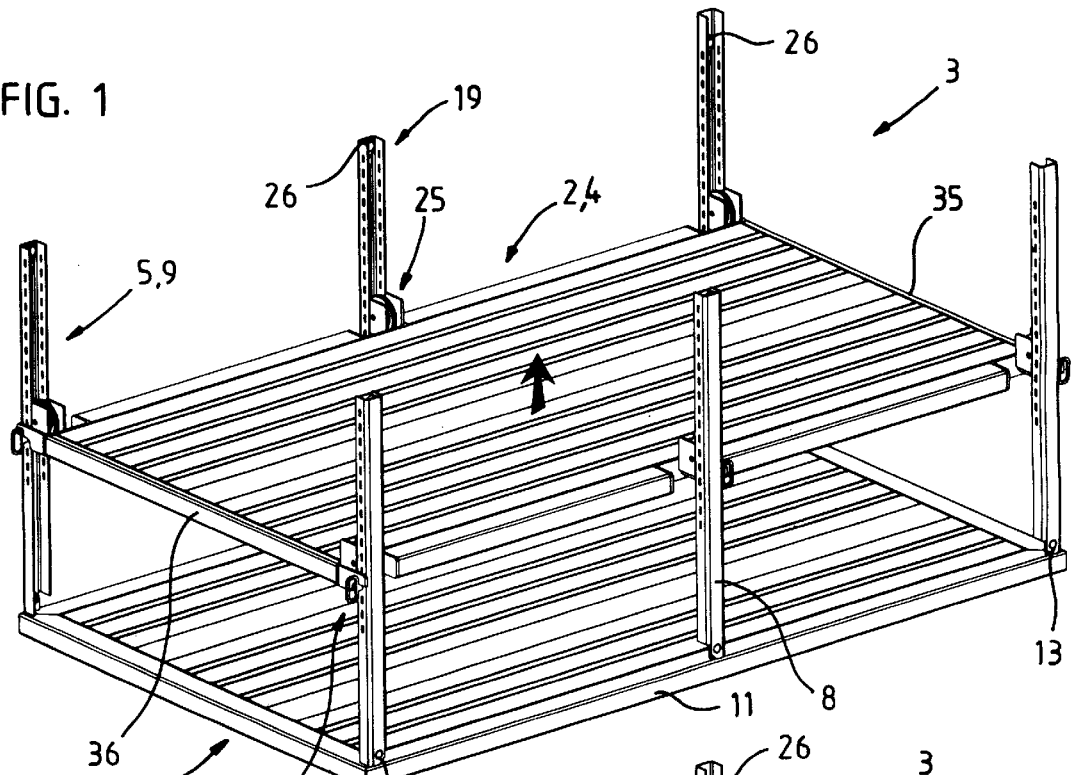
Figure 2:
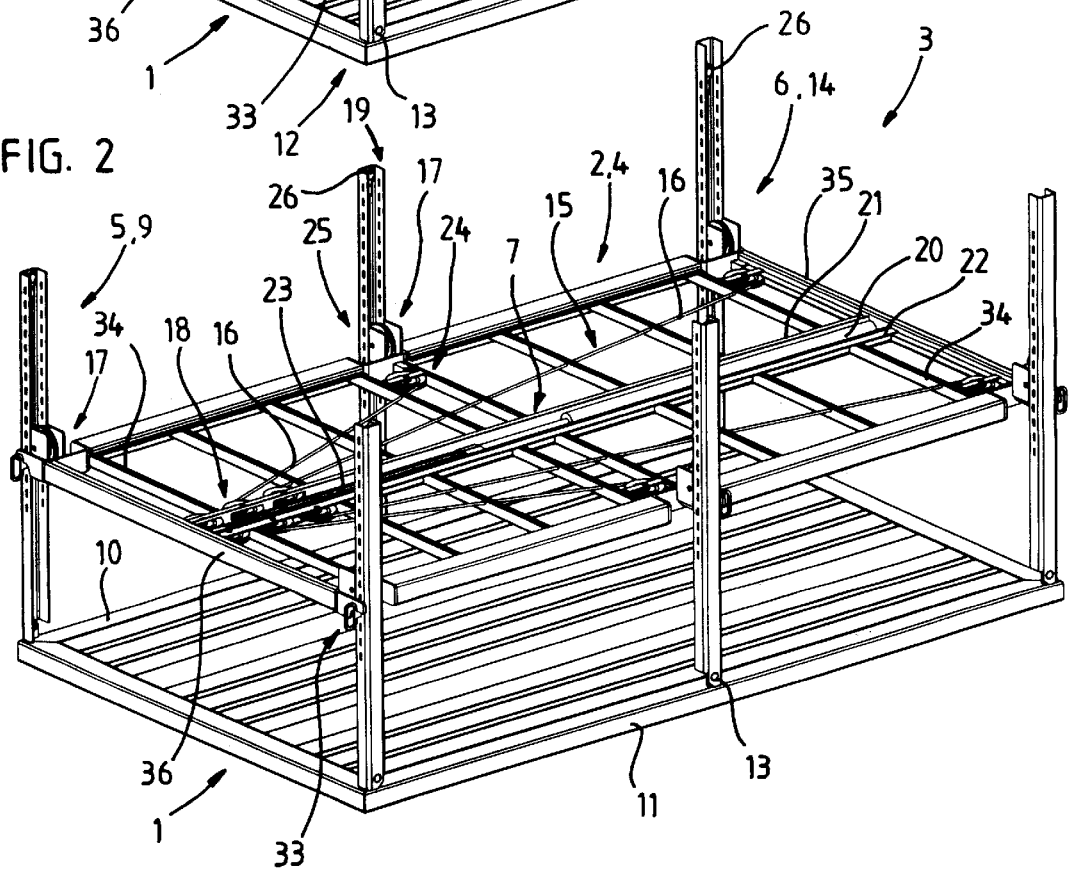
Figure 3:
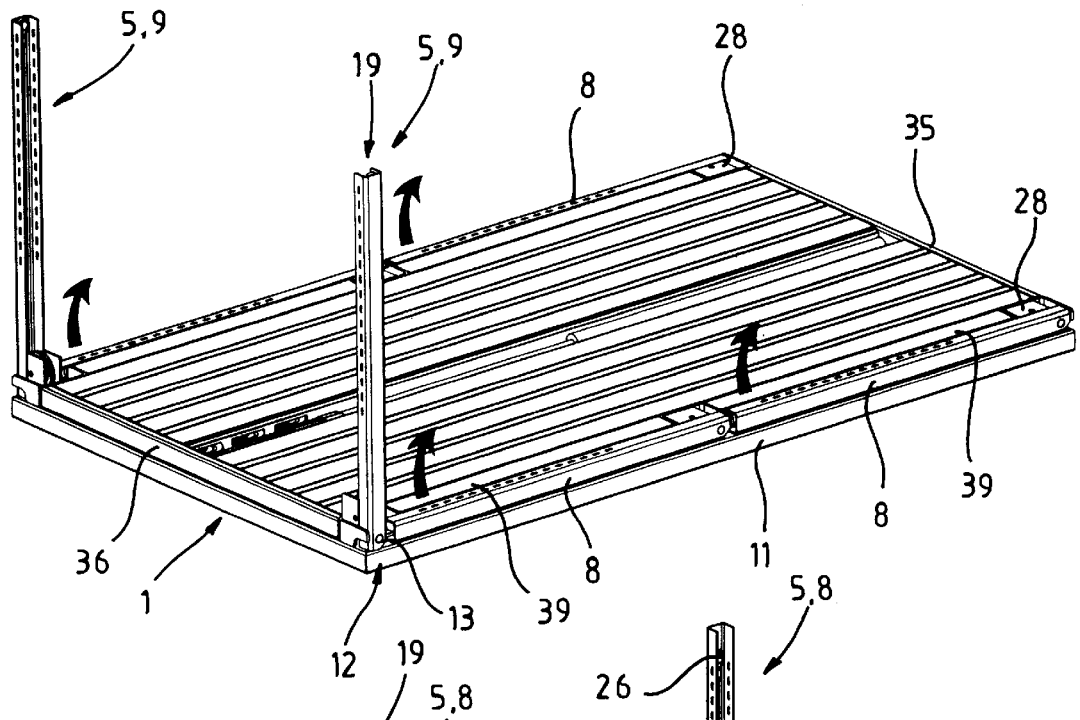
Figure 4:
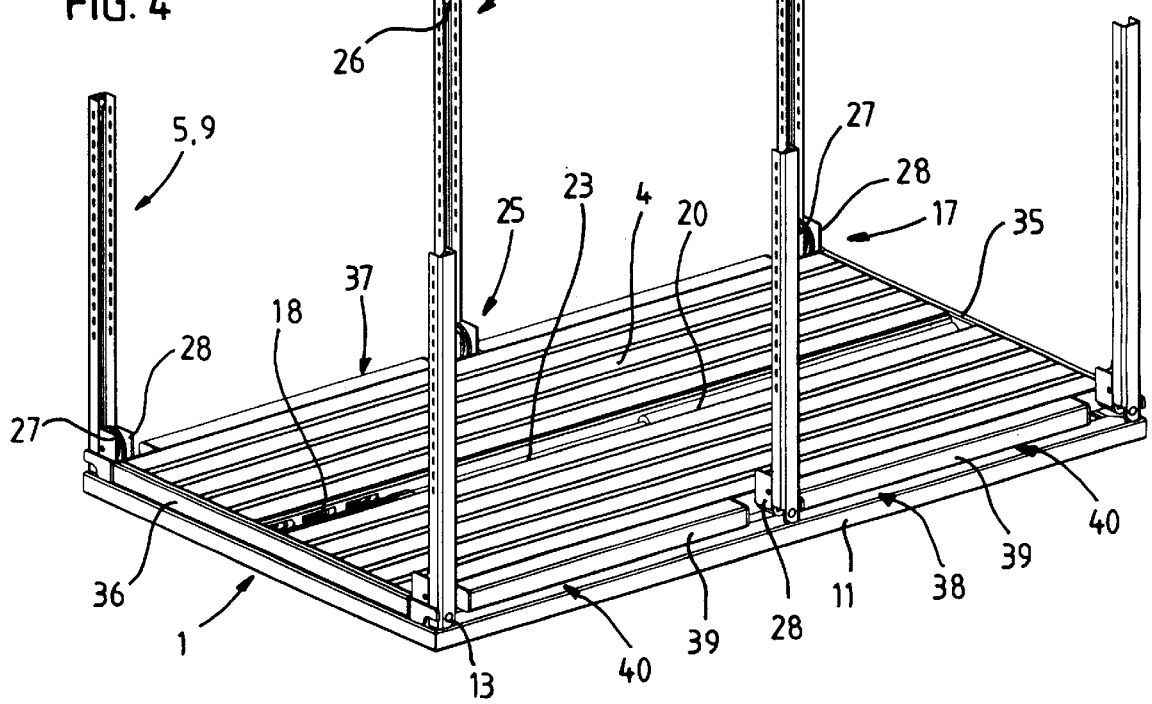

The structural unit of the invention is designed for quick, easy assembly on the movable deck of a transport vehicle comprising a chassis (not shown) and a primary deck 1, with the potential of adding either a second adjustable height loading deck 2, or, after collapsing the structure, conventional empty cargo space which is just as easily accessible.

Thus, as already described, one simple, quick operation transforms the unit from a single transport deck configuration into a dual transport deck configuration, and conversely.

In general, the structural assembly according to the invention has one autonomous cargo structure 3 formed of a vertically movable supplemental deck 4, support posts 5 along which the supplemental deck is displaced, as well as support means 6 for the supplemental deck, and a drive member 7 which raises and lowers the supplemental deck.

There are two types of support posts 5: first, collapsible longitudinal posts 8, and second, front posts 9, which are preferably fixed or affixed, and which may be attached to the existing carriage structure in order to stabilize the unit by absorbing lateral and longitudinal braking or acceleration forces.

Supplemental deck 4 is as thin as possible so that the movable transport base retains substantially its entire cargo capacity when in the so-called collapsed position, that is, with the supplemental deck lowered and the posts stored within the supplemental deck.

For this reason, longitudinal posts 8 alternate between an erect, vertical position when operative and supporting the supplemental surface, and a retracted position, in which supplemental deck 4 rests on primary deck 1 and the posts are folded up along the longitudinal edges 10, 11 of the primary deck.

More specifically, each longitudinal post 8 pivots at its lower extremity 12 on a transverse axle 13 which may be attached to the longitudinal elements or edges 10, 11 of the fixed primary deck 1 or to its adjacent structures.

Supplemental deck 4 is supported by a pendular suspension system 14 which maneuvers it using cables and pulleys or the like, vertically driven by drive member 7 housed within the movable deck.

An elementary lifting system 15 is associated with each post, comprising a cable 16, a return element 17, and a drive pulley 18 activated by drive member 7.

According to one variation, cable 16 is constant in length. It is immobilized at either end: first, at a point on the upper extremity 19 of each corresponding post 8 or 9; and second, inside supplemental deck 4, for example, on drive member 7.

Supplemental deck 4 is a vertically movable platform held by support posts 8 and 9.

More specifically, the drive member may consist of a cylinder 20 longitudinally disposed inside the supplemental deck, for example, positioned in the median. It actuates the series of pulleys engaging each suspension cable 16. The number of cables is equal to the number of support posts 8 and 9.

Each cable 16 originates at a point which may be located along rails 21, 22 bordering the barrel of cylinder 20 or, preferably, cylinder shaft 23. Next, it is pushed back by drive pulley 18, affixed to the movable deck, and then returned inside the post by return unit 17 formed of a pair of crossed return pulleys 24 and 25 as far as a fixed point 26 at the upper end 19 of each post 8, 9, where the free end of the cable is immobilized. This fixed point 26 is located inside of each post.

The posts constitute guides for the movable return pulley, and for this reason, they are arranged within a "U"-shaped or a "C"-shaped cross-section.

The interaction between the two crossed return pulleys involves a first return pulley 24 incorporated within the movable platform near the lower base of the post, and a movable, collapsible, vertical pulley 25 attached between two side pieces 27 and 28 supporting its rotation axle 29. When the movable deck moves, this movable return pulley 25 is displaced along the corresponding post which it uses as a guide.

Figure 5:
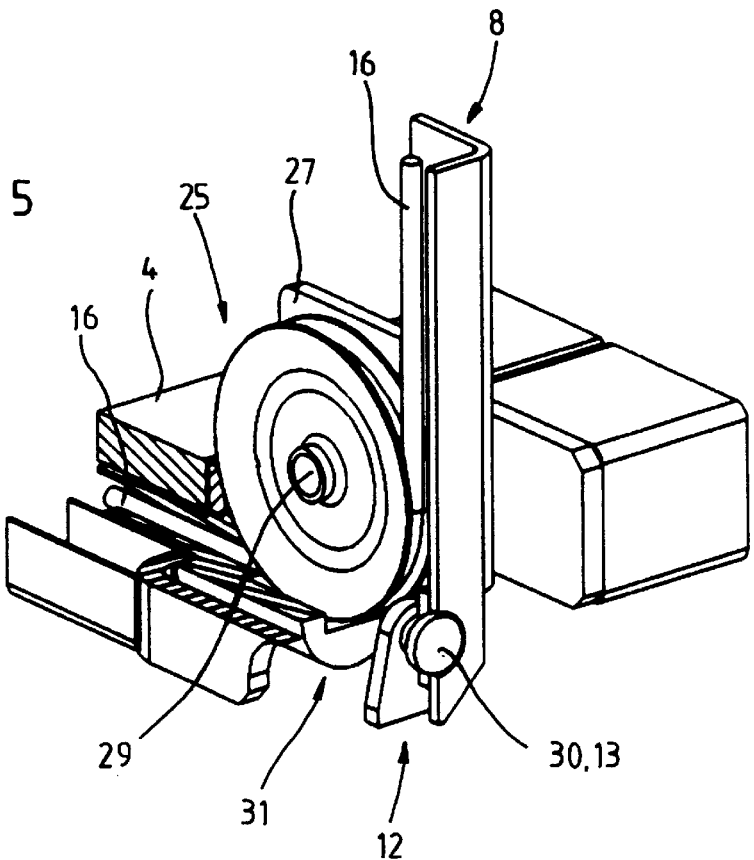
Figure 6:
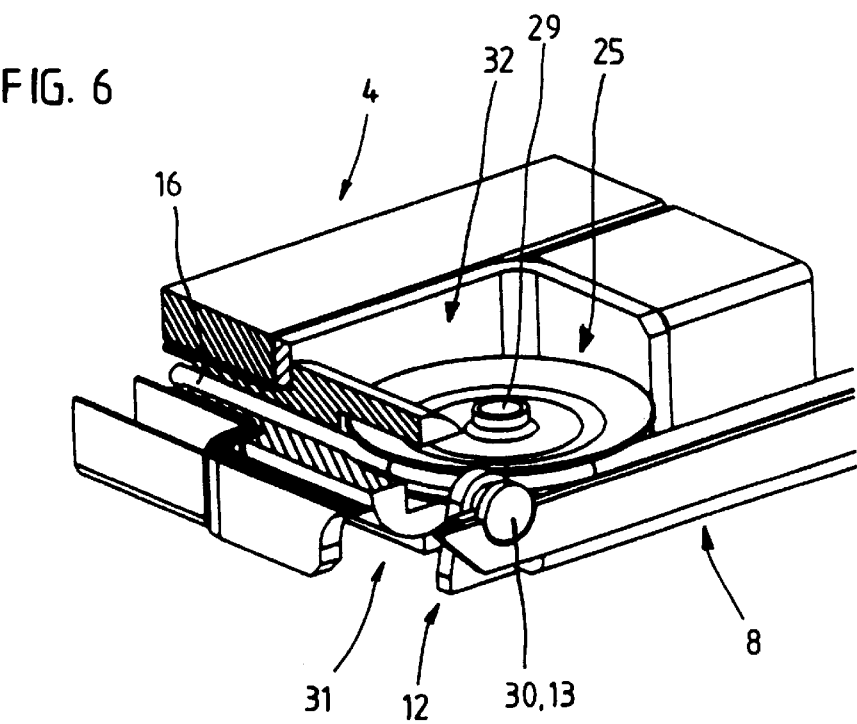

As shown in detail in FIGS. 5 and 6, the support for pulley 25 pivots about a transverse horizontal axle 30 which is a "C"-shaped element 31 contained within the deck and coaxial to the axis along which adjacent post folds 13. This arrangement allows the movable return pulley to assume a horizontal position in which it is completely enclosed inside an opening 32 formed in the movable deck.

Posts 8 or 9 have perforations which may cooperate, for example, with blocking elements such as pins 33 in order to maintain or immobilize the platform in a predetermined locked position.

The movable deck consists of a frame of cross struts 34, end struts 35 and 36, and a central crosspiece formed of two rails 21 and 22. Discontinuous longitudinal edges 37 and 38 formed of elements such as element 39 close the extremities of the struts and are set back from the border of the longitudinal rims 10 and 11 of primary platform 1.

This setback forms an opening 40 between the exterior boundaries of primary platform 1 and the boundaries of movable deck 4 that is large enough to accommodate the nearby post, which will fold down inside it.

Because the movable platform is so thin and the posts and projecting structures can be collapsed for storage, a flat, smooth loading surface results, substantially identical to the primary deck and only a short distance from it, since the movable deck adds very little bulk.

Collapsible posts 8 are articulated to pivot on the deck at their lower extremities, which are attached to a suitable support. Alternatively, they could be locked to the fixed elements of the vehicle structure, such as the upper crosspieces or the like, with quick connect/disconnect means.

Certain posts can also be maintained in upright position using lateral supports with counter pins or other such means.

Mounting the assembly of the invention is a simple, quick procedure.

The vehicle to be equipped is temporarily stripped of its removable lateral covers: canopies, container, etc. Front posts 9 are attached to the existing carriage structure while lateral posts 8 are pivotably attached to transverse axles on the struts of the longitudinal edge of the primary deck or to appropriate supports.

Supplemental movable deck 4 is introduced between the posts and positioned on the primary deck. The free ends of cables 16 of the suspension and maneuver units 14 are attached to the upper portions of the posts.

The drive member 7 is connected to its energy source and the unit undergoes testing before being declared operational.

I claim:

1. An assembly for road vehicles comprising
   a fixed lower platform;
   a series of vertical posts being supported by the platform;
   an intermediate loading deck being translationally movable along the vertical posts between an upper position, in which the deck is spaced from the platform, and a lower position, in which the deck abuts against the platform, and vertical movement of the deck along the vertical posts being controlled by a drive member provided inside the deck; and
   at least some of the posts being collapsible, at a base of the post, to fold below an upper surface of the deck when the deck is in its lower position thereby to form a completely free loading area.

2. The assembly according to claim 1, wherein some of the posts located along longitudinal and rear edges of the platform are collapsible and foldable parallel to the platform and a remainder of the posts are fixed relative to the platform.

3. The assembly according to claim 2, wherein the deck has recessed areas on a periphery thereof which form housings for receiving the foldable posts when the posts are folded parallel to the platform.

4. The assembly according to claim 1, wherein the deck is supported by a plurality of cables which extend between the upper extremities of all of the posts to the deck, and the cables are coupled to the drive member to control movement of the deck.

5. The assembly according to claim 4 wherein the drive member is housed within and interior of the deck.

6. The assembly according to claim 5, wherein the drive member is a movable cylinder which controls movement of the deck via the cables and pulleys supported by the assembly.

7. The assembly according to claim 6, wherein each cable passes through an interior of the deck and is then directed, by a unit of return pulleys, toward the upper extremity of each post.

8. The assembly according to claim 7, wherein each unit of return pulleys is formed of a first pulley and a second pulley, and the second pulley folds in combination with its associated post inside a housing located adjacent the base of the associated post.

9. The assembly according to claim 8, wherein the first pulley is supported by and movable with the deck and the second pulley is movable along its associated post via a guide on the associated post.

10. The assembly according to claim 1, wherein the deck is thin to result in a compact fold assembly.

* * * * *